UNITED STATES PATENT OFFICE.

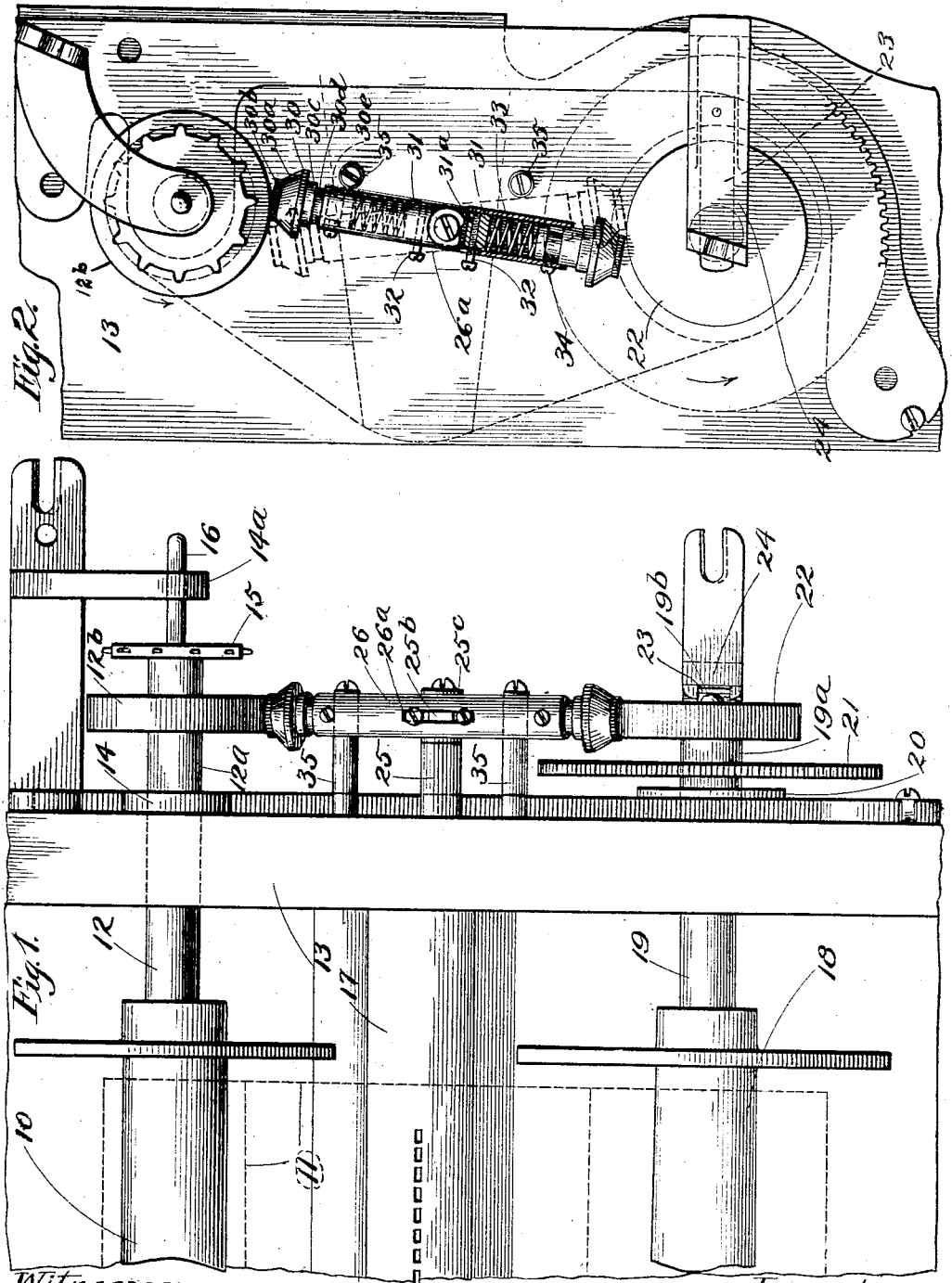

CHARLES FREBORG, OF KANKAKEE, ILLINOIS.

BRAKE FOR PLAYER-PIANO ROLLS.

1,234,325.     Specification of Letters Patent.     Patented July 24, 1917.

Application filed January 2, 1914. Serial No. 809,959.

*To all whom it may concern:*

Be it known that I, CHARLES FREBORG, a citizen of the United States, residing at Kankakee, in the county of Kankakee and State of Illinois, have invented certain new and useful Improvements in Brakes for Player-Piano Rolls, of which the following is a specification.

This invention relates to improvements in brakes for player-pianos, and has for its principal object to provide a mechanism which will automatically brake or slightly resist the movement of player piano rolls.

It is a well known fact that in the operation of player pianos, when the same are being played, the music roll or roller tends to over-run, due to the fly-wheel action thereof and interfering with the proper operation of the device. Similarly when re-rolling the music, the collecting reel tends to over-run even more than in the case of the music roll, since no vacuum is operating through the tracker bar to resist the movement of the music sheet.

My device provides for the elimination of this over-running in either direction by applying a brake or drag to the roll or the reel, as the case may be, automatically reversing to brake the opposite member of the two when the music is reversed.

I further provide means for adjusting the operation of my brake member.

Other objects will be set forth and made apparent in the following specification and accompanying drawings, in which I have shown a specific embodiment of my invention.

Refering to the drawings;

Figure 1 is a front elevation of my device showing the same applied to one form of player-piano mechanism;

Fig. 2 is a side elevation of the same, a part of the braking member being broken away.

Like numerals refer to like elements throughout the drawings, in which 10 designates generally a music roll carrying a usual perforated sheet of music indicated by numeral 11 and adapted to detachably engage the shaft 12 projecting through the frame member 13. The roll 10 is similarly mounted upon a rotating spindle or shaft at its opposite end, not shown. The shaft 12 extends through and is journaled in the frame member 13, being extended through the bearing proper, indicated by numeral 14 and provided with the outwardly extending portion 12$^a$ to which is secured the collar 12$^b$. Outwardly of the collar 12$^b$ is provided a sprocket 15 and outwardly of the latter, the spindle 16, forming in effect a continuation of the shaft 12, is journaled in the depending bracket 14$^a$ formed integrally with the bearing 14, as shown in Fig. 1.

Located below the tracker bar 17, is what I term the collecting reel 18 supported and driven by the shaft 19 which extends through the frame 13 and is journaled in a bearing 20 preferably formed integrally with the bearings 14 and 14$^a$. This shaft 19 is provided with the extension 19$^a$ outwardly of the bearing 20 and has secured thereto the gear 21 and a collar 22 spaced from the gear. The portion 19$^a$ of the shaft 19 terminates in the stud 19$^b$ outwardly of the collar 22 and this stud abuts against a leaf spring 23 carried by bracket 24 which is formed integral with the other bearing members.

It is to be noted that a conventional form of driving mechanism, not shown, may be provided coacting with the sprocket 15 and gear 21 to positively drive the latter when the player-piano is being operated to produce music, the driving mechanism in this operation permitting free rotation of the music roll 10, the latter being rotated by the driving of the sheet music 11, by the collecting reel 18. Similarly, when it is desired to re-roll the music upon the roll 10, the driving mechanism permits free rotation of the gear 21 and shaft 19 and operates to positively drive the sprocket 15, the sheet music 11 serving to rotate the collecting reel 18, as will be apparent. In both of these operations frequently the fly-wheel action of the non-positively driven roll or reel causes the same to over-run, thereby bulging the sheet between the roll and reel and serving in the one case to interfere with the correct playing of the piano, and in the other causing loose re-rolling of the sheet music and also tending to wrinkle and destroy the same. To eliminate these disadvantages I have provided the improved brake mechanism which is hereinafter described.

A pivotal supporting post 25 projects from one side of the frame 13 approximately at right angles thereto and slightly off the line of centers of the collars 12$^b$ and 22, as is clearly shown in Fig. 2. The braking member proper comprises a sleeve or cylinder 26, centrally apertured and mounted upon the reduced portion 25$^b$ of the post 25. A collar or washer 25$^c$ serves to prevent outward movement of the sleeve 26 in one direction and the enlarged portion of the post 25 in the other. Brake contacts, generally indicated by numeral 30, are located in each end of the sleeve 26. Each of these brake contacts 30 is provided with the head 30$^a$ apertured at one end to provide a seat for the braking material 30$^b$, such as felt or the like. The other end of the head 30$^a$ is provided with a collar 30$^c$ and the shank or stem 30$^d$ provided with the peripheral groove 30$^e$ therein. Blocks 31 are located in the sleeve 26 on each side of the pivot post 25, as clearly shown in Fig. 2. These blocks closely fit the interior of the sleeve and are apertured and threaded at 31$^a$. A screw 32 is inserted through the slot 26$^a$ in the sleeve 26 and passes through threaded aperture 31$^a$ in the block 31. One of these screws 32 is provided for each block and it will be apparent that the block may be moved to any position within its limits and retained in such position by screwing the member 32 therethrough into contact with one side of the sleeve. A coil spring 33 is located between each block 31 and the corresponding brake contact 30. Adjacent each end of the sleeve 26 a small screw 34 is inserted fitting in the groove 30$^e$ of the corresponding contact member 30 so as to permit some movement thereof, against the spring.

It will be apparent that the coil springs 33 will operate to normally maintain the contact members 30 in outwardly extended position. Stops 35 are secured to the frame member 13 and serve to limit the pivotal movement of the sleeve 26 in either direction. Owing to the location of the pivot post 25 and the construction of the braking member, it is apparent that when the same is swung to the position shown in Fig. 2, for example, that is contacting or resting against the upper of stops 35, the upper contact member will cause contact of the braking material 30$^b$ with the surface of the collar 12$^b$, this contact being such as to prevent over-running of the roll 10 while not greatly resisting its necessary movement, the braking material 30$^b$ being of some suitable elastic material such as felt or the like.

When in the position shown in Figs. 1 and 2, the lower of contact members 30 is out of contact with the collar 22 and motion of the reel 18 is not interfered with, the same being positively driven through the medium of the gear 21, as explained above. When it is desired to re-roll the sheet, the driving mechanism not shown, is operated as ordinarily, to disconnect the positive drive of gear 21 and substitute therefor, positive drive of sprocket 15 at the same time reversing its direction of rotation. This causes a reverse direction of rotation of the reel 18 through the medium of the sheet of music. This new rotation of both roller and reel will be opposite to the direction indicated by the arrows in Fig. 2. At the same time both roll and reel will be rotating in the same direction. The collar 12$^b$, upon reversal of its rotation, and through the medium of its contact with braking contact 30$^a$, will operate to start the braking member from its contact with the post 35. At the same time the opposite braking contact 30$^a$ will begin to contact with the surface of roller 22 and the coaction of these two rollers rotating in the same direction will operate to force the braking member to the position shown in dotted lines in Fig. 2 wherein it contacts with the post 35, the spring members 33 permitting sufficient contraction of the contacts 30$^a$ to permit such movement of the braking member. When in this new position the lower of contacts 30$^a$ will brake the movement of the roll 18 through the contact with the roller 22 and thereby serve to prevent over-running of the same due to variations or fluctuations in the speed of the roll 10, which in this operation is being positively driven through the medium of sprocket 15.

Inasmuch as the driving mechanism from the member to the gear 21 and sprocket 15 forms no present part of this invention, I have not deemed it necessary to show the same in the accompanying drawings.

It will be apparent that when the braking member is in the position shown by the dotted lines in Fig. 2, the upper of contacts 30$^a$ will not interfere with the movement of collar 12$^b$.

It will be obvious from the above description and accompanying drawings that I have provided a braking device capable of overcoming the defects enumerated in the preamble hereto and which will automatically coact with the free running roll or reel according as the one or the other is running free.

It will be obvious that my device is capable of modifications and changes and may be applied to various forms of player-piano mechanism, and I do not wish to restrict myself to the showing and description beyond the scope of the appended claims.

What I claim is:—

1. In combination, a music roll element and a collecting reel element arranged the one to run free while the other is positively driven and vice versa, and means to brake the free-running element, said means being constructed and arranged to coact with said elements to automatically transfer its braking effect from one element to the other upon reversal of rotation of said elements.

2. A pair of spaced apart rotatable shafts, and means to brake one of said shafts during rotation thereof in one direction, said means being constructed and arranged to coact with said shafts to automatically transfer the braking effect from one to the other thereof upon a reversal of motion of said shafts.

3. In combination a pair of rotatable shafts, collars carried thereby, and a braking member coacting therewith and constructed and arranged to coact with one of said collars to brake rotation of said shaft when said shafts are rotating in one direction, said member being constructed and arranged to coact with said shafts and collars to transfer the braking effect from one to the other upon a reversal of rotation of said shafts.

4. In combination, a music roll supporting and driving shaft, a reel supporting and driving shaft, collars carried thereby, a brake member pivotally mounted to contact with one of said collars when said shafts are rotating in one direction and to contact with the other of said collars when said shafts are running in the opposite direction, said braking member being provided with spring extended contacts adapted to contact with said collars.

5. In combination, a music roll supporting and driving shaft, a reel supporting and driving shaft, collars carried thereby, a brake member pivotally mounted at a point outside the line of centers of said shafts to contact with one of said collars when said shafts are rotating in one direction and to contact with the other of said collars when said shafts are running in the opposite direction, said braking member being provided with spring extended contacts adapted to contact with said collars.

6. In combination, a music roll supporting and driving shaft, a reel supporting and driving shaft, collars carried thereby, a braking member coacting with said collars to resist the movement of said shafts when running free, said braking member comprising a sleeve and a pair of braking contacts carried thereby.

7. In combination, a music roll supporting and driving shaft, a reel supporting and driving shaft, collars carried thereby, a braking member coacting with said collars to resist the movement of said shafts when running free, said braking member comprising a sleeve, and a pair of spring extended braking contacts carried thereby.

8. In combination, a music roll supporting and driving shaft, a reel supporting and driving shaft, collars carried thereby, a braking member coacting with said collars to resist the movement of said shafts when running free, said braking member comprising a sleeve and a pair of braking contacts carried thereby, and braking material carried by each of said contacts.

9. In combination, a music roll supporting and driving shaft, a reel supporting and driving shaft, collars carried thereby, a braking member coacting with said collars to resist the movement of said shafts when running free, said braking member comprising a sleeve, a pair of spring extended braking contacts carried thereby, and means to adjust the tension of said springs.

In testimony whereof, I have subscribed my name.

CHARLES FREBORG.

Witnesses:
WILLIAM N. HEHS,
CHARLES G. TENGDIN.

Copies of this patent may be obtained for five cents each, by addressing the "Commissioner of Patents, Washington, D. C."